United States Patent
Kacevas et al.

(10) Patent No.: US 6,429,873 B1
(45) Date of Patent: Aug. 6, 2002

(54) ADDRESSING OF MONOLITHIC TEXTURE MAPS

(75) Inventors: Nicolas I. Kacevas, Haifa (IL); Val G. Cook, Shingle Springs; Peter L. Doyle, El Dorado Hills, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,182

(22) Filed: Dec. 29, 1999

(51) Int. Cl.$^7$ ................................. G06T 11/40

(52) U.S. Cl. ................. 345/587; 345/552; 345/561; 345/563

(58) Field of Search .................. 345/587, 552, 345/561, 563, 626

(56) References Cited

U.S. PATENT DOCUMENTS

| | | | | |
|---|---|---|---|---|
| 5,706,481 A | * | 1/1998 | Hannah et al. | 707/519 |
| 5,953,015 A | * | 9/1999 | Choi | 345/430 |
| 5,963,220 A | * | 10/1999 | Lee et al. | 345/507 |

* cited by examiner

Primary Examiner—Jeffery Brier
Assistant Examiner—Faranak Fouladi
(74) Attorney, Agent, or Firm—Blakely, Sokoloff, Taylor & Zafman LLP

(57) ABSTRACT

A method and circuit for determining the address of texture maps in memory, when only the base address of the primary texture map is known. The various maps associated with a given texture are sized and stored in a manner that allows any texel in any of the maps to be located based on the map number and the base address of the primary map. A circuit is provided that determines the necessary addresses with minimal calculations.

24 Claims, 2 Drawing Sheets

ADDRESSING OF MONOLITHIC TEXTURE MAPS

BACKGROUND OF THE INVENTION

1. Field of the Invention

The invention pertains generally to texture maps in graphics processing. More particularly, it pertains to an addressing scheme for locating texture maps.

2. Description of the Related Art

Modern three dimensional (3D) graphics processors use a number of techniques to speed up graphics processing. One of these techniques is the use of texture maps. When an object is to be depicted in a displayed image, the size of the object in the display will decrease as the perceived distance of the object from the viewer increases. (Note: the word 'object', as used herein, applies to any displayable image in a portion of the screen, whether it includes one or more viewable entities, a portion of one viewable entity, a portion of a viewable surface, etc.) It is possible to construct each object from scratch at the proper size whenever the object is to be displayed, but it is much more efficient to construct the object ahead of time and store it for quick retrieval whenever the object is to be displayed. Since the object may be shown in various sizes, several different sizes of the object are constructed and stored for later retrieval. Starting with the largest version, each of these versions is a progressively lower resolution pre-filtered representation of the previous one. A group of these differently-sized versions of the same object is collectively referred to as a mip-map. Each differently-sized version, which are referred to herein as maps, is associated with a certain Level of Detail (LOD) parameter. The most common maps progress in powers of 2, so that each successive map (LOD 0, LOD 1, LOD 2, etc.) has half the horizontal and vertical dimensions as the previous map.

In conventional implementations, the various maps of a single mip-map are spread throughout storage memory in such a way that the starting point for each map (the starting memory address where each map resides) is not related to the starting point of any other associated map. Because of this, a graphic engine that generates memory accesses for different LODs will have to internally store the starting address for every map. In addition, modern graphics engines tend to have several mip-maps active at one time, each one with its own set of maps, which multiplies the number of addresses that must be stored and the amount of memory that must be devoted to this function.

SUMMARY OF THE INVENTION

An embodiment of the invention includes a subtractor circuit having first and second subtractor inputs and a first subtractor output to generate a first difference signal. It also includes a first mask circuit having a first mask input coupled to the first subtractor input and a first mask output to generate a first thermal mask, and further includes a second mask circuit having a second mask input coupled to the first subtractor output and a second mask output to generate an inverted second thermal mask. It also includes a combinatorial logic circuit to perform a logic operation on the first and inverted second thermal masks, with the combinatorial logic circuit having a first logic input coupled to the first mask output, a second logic input coupled to the second mask output, and a first logic output.

DETAILED DESCRIPTION OF THE INVENTION

The current invention places each of the related maps of a mip-map at memory locations that have a predefined relationship with one another, so that only the base address of the mip-map needs to be maintained. The address of each map within the mip-map can be ascertained from the base address, based on the LOD number. Further, all of the maps in a single mip-map are constrained within a block of contiguous memory locations so that it is feasible to store an entire mip-map in cache for quick retrieval. The predefined relationship between map addresses in a mip-map permits the calculation of the address for a specified map, or the address of a particular location within the map, to be performed in a simple hardware circuit.

Figure 1:
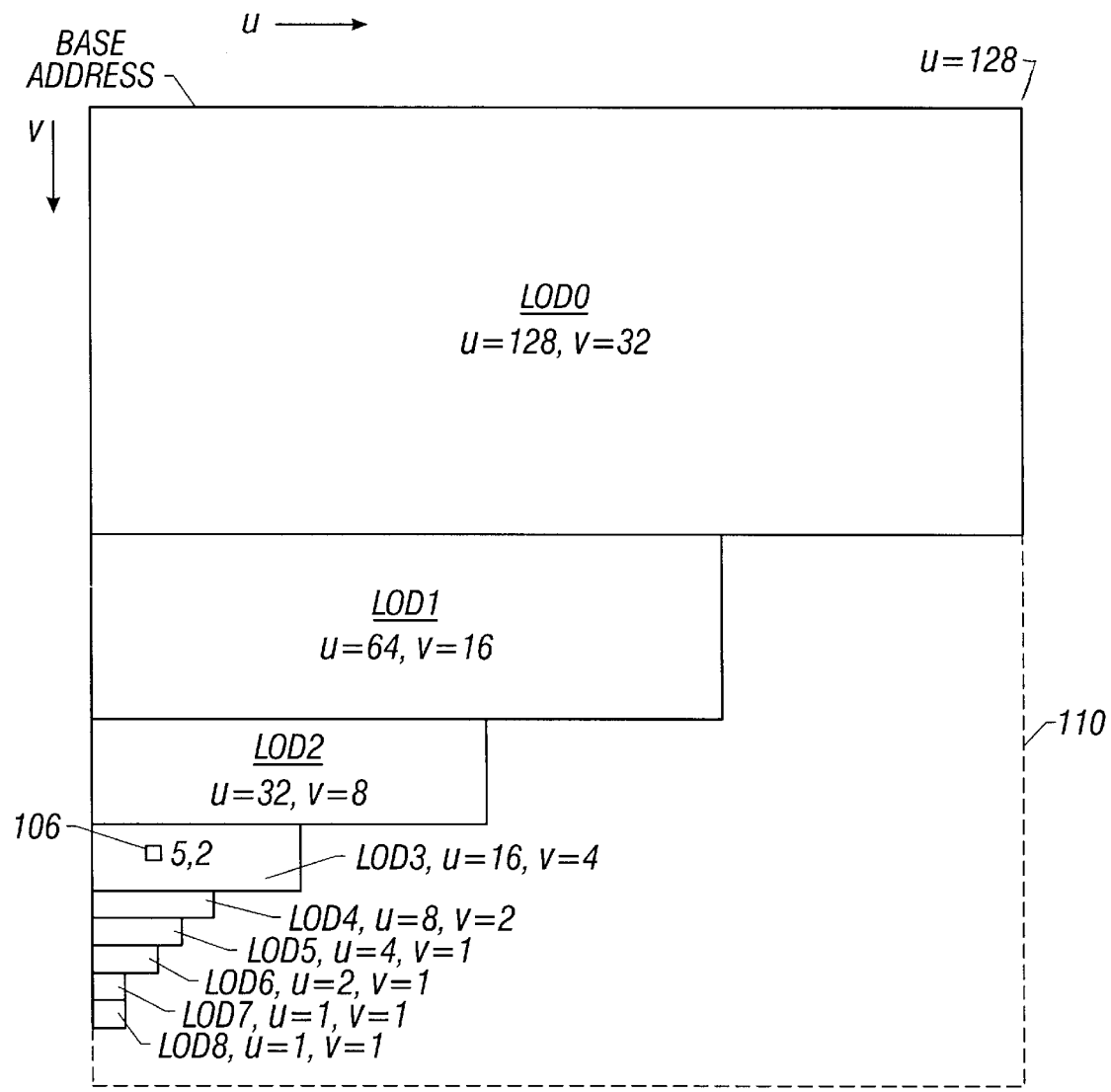
FIG. 1 shows a mip-map of the invention.

FIG. 1 shows a representation of the various maps in a single mip-map, each map being identified with its LOD number. Each map is shown in Cartesian coordinates, with a u (horizontal) dimension that increases from left to right, and a v (vertical) dimension that increases from top to bottom. The units of u and v can be expressed in texels (texture elements), which represent the smallest displayable unit in the map image (each texel has a uniform color and intensity throughout its area, and cannot be subdivided into smaller units with different colors/intensities). A texel is similar to a pixel (picture element), except that a pixel is the smallest addressable unit in the displayable image of the display unit, while a texel is the smallest addressable unit in the conceptual image of the mip-map. Depending on the addressable resolution of the display unit to be used, there may or may not be a one-to-one mapping of texels to pixels.

Each LOD rectangle in FIG. 1 represents a specific map. Maps may be designed in various sizes. For illustrative purposes, the largest of the maps (LOD 0) in FIG. 1 is shown with dimensions of 128 texels horizontally and 32 texels vertically. LOD 1 is half that size, or 64 by 16 texels, while LOD 2 is 32 by 8, etc., with each successive map having one-half the dimensions of the map above it. Since a dimension of one texel cannot be subdivided further, the maps cannot go below one texel in either height or width. This is illustrated by the v dimensions for LOD's 6 through 8, whose heights are clamped at one texel, and the u dimension of LOD 8, whose width is clamped at one texel.

The upper left corner of the primary map LOD 0 is the base address for the entire mip-map, which includes nine maps in the example shown in FIG. 1. In one embodiment, these rectangular maps are overlaid onto memory addresses in much the same manner as a scanned image: beginning with the base address, sequential memory addresses contain the texel information for the first row from left to right, then the second row from left to right, etc., until all rows for all maps have been covered. Each row has a width equal to the width of rectangle 110 in FIG. 1. This width is referred to as the pitch, and each row includes enough addressable locations to accommodate the entire pitch, even though some of those locations fall outside of any map. In FIG. 1, the pitch is the same as the width of the largest map, but the pitch can also be larger than the width of any of the maps.

Each map has a width of $2^X$ texels, where X is an integer. The height of each map is also a power of 2. Following this scheme, the embodiment shown in FIG. 1 has a pitch of 128, and the texel dimensions of maps LOD 0–5 are 128×32, 64×16, 32×8, 16×4, 8×2, and 4×1. Any maps beyond LOD 5 clamp the minimize height at one texel for the reasons previously mentioned. Any maps beyond LOD 7 also clamp the width, and are 1×1 texels in size.

It can be seen in FIG. 1 that the maps are placed in memory so that every map has a starting u coordinate of u=0. This eliminates the need to compute a u coordinate for the starting position (upper left corner) of any map. Therefore the u coordinate of a given texel in a given map can be determined simply by adding the local u coordinate (the u-offset from the starting position of the map in which the texel resides) to the base u coordinate. The v coordinate can be determined by calculating the starting v coordinate of the starting position of the map in which the texel resides, and adding the local v coordinate to it.

As an example, consider texel 106 with local coordinates of u=5 and v=2 in LOD 3. The u coordinate is simply the base u coordinate plus 5. The v coordinate is calculated by adding the base v coordinate to the sum of the heights of LOD 0, LOD 1, and LOD 2 to determine the starting v coordinate of LOD 3, and then adding the local v coordinate of 2 to this sum. The starting v coordinate (first row) of LOD 3 will be 32+16+8, or in binary:

$$V = 0010\ 0000 + 0001\ 0000 + 0000\ 1000 = 0011\ 1000. \quad (1)$$

The leftmost 1 bit is in the decimal 32 position, which is the vertical size of LOD 0, referred to as Vsize. The number of 0's from the rightmost 1 bit is:

$$\log 2(Vsize) - (LOD-1) = 5 - (3-1) = 3 \quad (2)$$

where log2(Vsize) is the base 2 log of the quantity Vsize, while LOD is the number of the map containing the selected pixel.

The results of equation 1 can be achieved by performing an AND operation between two binary masks. One mask contains all 0's followed by all 1's starting in the bit position defined by log2 of the vertical size of LOD 0. The other mask contains all 1's through the bit position defined by equation 2, followed by all 0's. Binary numbers with this format (all 0's followed by all 1's, or all 1's followed by all 0's) are commonly known as thermal codes, and the masks described herein are therefore referred to as thermal masks.

Following the same example as used above in equations 1) and 2), the two thermal masks would be:

Mask 1=0011 1111

Mask 2=1111 1000

$$\text{Mask } \mathbf{1} \text{ AND Mask } \mathbf{2} = 0011\ 1000 \quad (3)$$

which is the starting v coordinate of the map for LOD 3. Thus the results of the multiple stage addition of equation 1 can be achieved more quickly with a simple binary AND operation between two thermal masks.

This procedure is adequate for larger maps, but does not address the aforementioned clamping problem caused when the map containing the selected texel is a small map that is artificially held to a minimum size of 1. To adjust for clamping, the number Z that has to be added to the results of equation 3 is:

$$Z = (LOD-1) - \log 2(Vsize) \text{ if this quantity is} > 0, \text{ otherwise } Z = 0. \quad (4)$$

In the example, Z=(3−1)−5=−3, which is not>0, so Z=0 because LOD 3 is not small enough to require clamping.

Thus in the general case, the starting v coordinate of the map containing the selected texel is:

$$v(start) = (\text{Mask } \mathbf{1} \text{ AND Mask } \mathbf{2}) + Z \quad (5)$$

This equation applies to both clamped and non-clamped maps.

Returning to the example, once the starting v coordinate of LOD 3 has been determined by using equation 3, the v coordinate of the selected texel within LOD 3 can be found by adding the local v (2 in the example ) to get the final v coordinate for the selected texel, referenced to the base address. The exponentially decreasing size of the maps dictates that this local v will be smaller than any of the previous map sizes and will occupy bit positions that are still zeros, so a simple binary OR operation can be used rather than actually adding:

$$0011\ 1000\ \text{OR}\ 0000\ 0010 = 0011\ 1010 \quad 6)$$

This is the v coordinate of the selected texel used in the example, as referenced to the base address. Its absolute value can be obtained by adding this value to the v coordinate of the base address (which will normally be zero unless the u-v coordinate system extends beyond this mip-map).

As previously mentioned, one embodiment of the invention stores each successive row of texels in sequential memory locations. In that embodiment, the memory address of the start of the selected LOD can be found by first multiplying the results of equation 5 by the pitch. This gives the texel displacement value for the start of the map, or the total number of texels that are sequentially stored in memory ahead of the selected map. This number can then be multiplied by the texel memory size (the number of memory locations that are used to represent each texel) to determine the amount of the memory offset between the selected map and the base address of the mip-map. One embodiment uses four bytes per texel, but other texel memory sizes can also be used.

In a similar manner, the memory address of the selected texel can be determined by first multiplying the v coordinate of equation 5 by the pitch, and then adding the u coordinate to get the texel displacement value for the selected texel. This number can then be multiplied by the texel size to get the memory offset between the selected texel and the base address of the mip-map.

Figure 2:
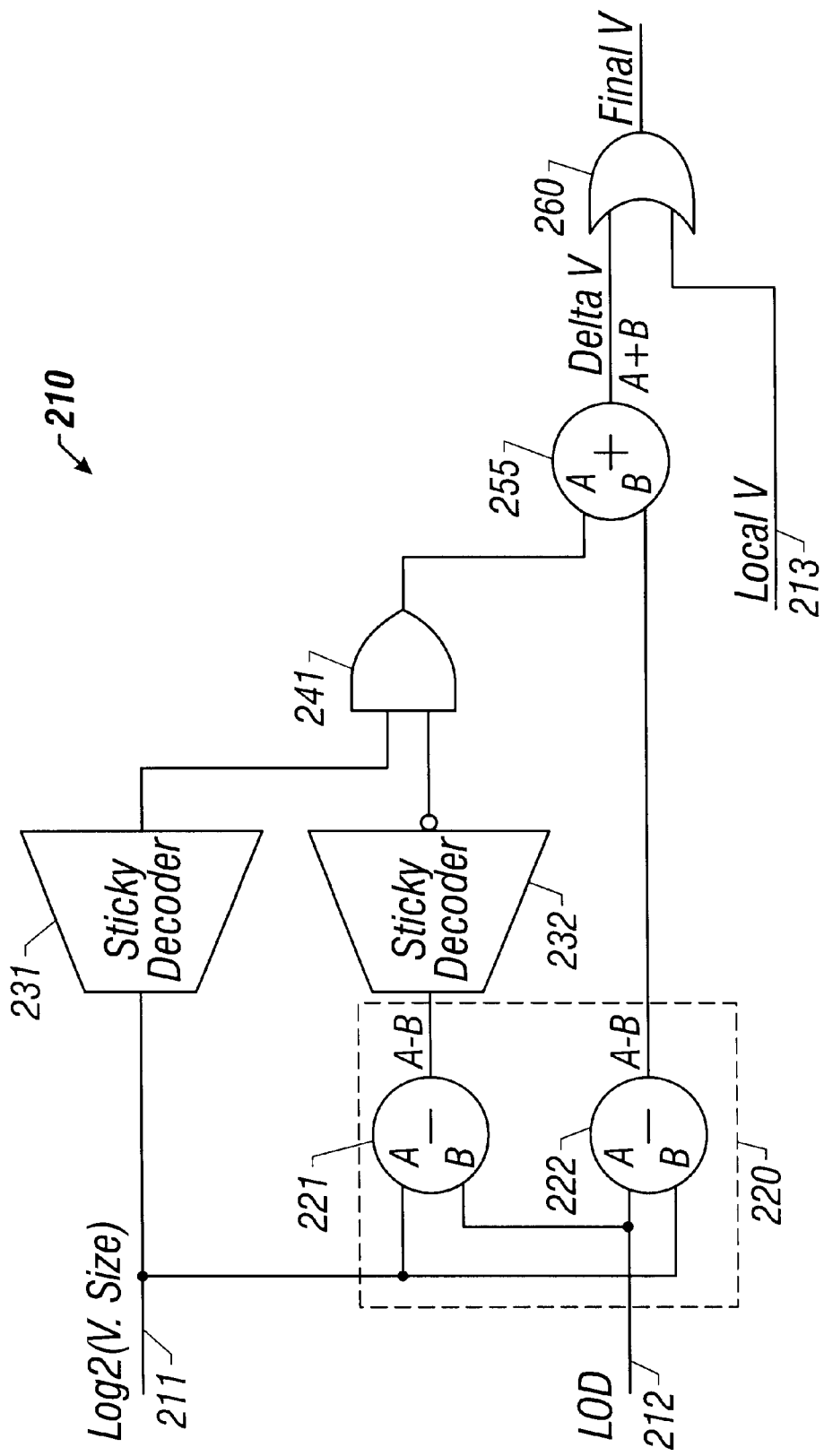
FIG. 2 shows a circuit for implementing the invention.

The previously described method of storing a mip-map in memory permits the location of a selected map or a selected texel within that map to be determined by the simple logic circuit 210 of FIG. 2. Logic circuit 210 has a first input 211 which receives a signal representing the quantity log2 (Vsize). In the previous example, the vertical size of LOD 0 is 32, so log2(32)=5. Second input 212 receives a signal representing the number of the selected map. In the previous example, this value would be 3, for LOD 3. The signals Log2(Vsize) and LOD are then provided to the inputs of a subtractor circuit 220, composed of subtractors 221 and 222. Subtractors 221 and 222 receive the same inputs, but in reverse order, so that subtractor 221 subtracts LOD from Log2(Vsize), while subtractor 222 subtracts Log2(Vsize) from LOD. Both subtractors are designed to output a zero in place of a negative number. Therefore, subtractor 221 will output a value x as the difference between A and B if A is larger than B, and otherwise will output a zero. Subtractor 222 will output a value −x as the difference between B and A if B is larger than A, and otherwise will output a zero. One embodiment uses two separate subtractors as shown in FIG. 2. Another embodiment uses a single subtractor to produce one of the desired output quantities x, and then inverts the output bits to produce−x+1, and decrements this value by 1 to produce−x. Additional logic can then be used to produce the '0' values where appropriate.

Input 211 is connected to the input of sticky decoder 231, while the output of subtractor 221 is coupled to the input of sticky decoder 232. Sticky decoders are devices that input a signal representing an integer i, and output a thermal code in the form of multiple bits with a logic '1' in the ith bit position and lower bit positions, and with a logic '0' in bit positions greater than the ith bit position. Sticky decoders are distinguished from standard decoders, which output a logic '1' only in the ith bit position, and output a logic '0' in all other bit positions. For improved speed, one embodiment uses sticky decoders with parallel inputs and parallel outputs.

In the example, sticky decoder 231 receives an input quantity of 5, and outputs a signal of 0011 1111, which is thermal mask 1 of previous equation 3). Sticky decoder 232 receives an input quantity of 5−3=2, and outputs a binary signal of 0000 0111. However, the output of sticky decoder 232 is inverted, converting its output to 1111 1000, which is thermal mask 2 of previous equation 3). These two signals are input to AND circuit 241, which performs an AND operation on the two inputs to produce the output signal 0011 1000. This number represents the sum of the heights of maps LOD 0, LOD 1, and LOD 2 in FIG. 1.

The output of AND circuit 241 is input to adder 255. As long as the value of Log2(Vsize) equals or exceeds that of LOD (i.e., if the map of LOD 3 is not clamped) subtractor 222 will output a zero to the other input of adder 255, and the output of adder 255 will be the same as the output of AND circuit 241. This output represents the starting v coordinate of the selected map without clamping. To get the v coordinate of the selected texel, the output of adder 255 is then combined with the value of the local v, which is the difference in v between the selected texel and the starting point of the map containing that texel. The exponentially decreasing size of the maps dictates that this local v will be smaller than any of the previous map sizes and will occupy bit positions that are still zeros, so a simple binary OR operation can be performed rather than actually adding the two numbers together. The local v signal is received by OR circuit 260 at input 213. The output of OR circuit 260 represents the final v value of the selected texel with reference to the base address.

When the value of LOD exceeds the value of Log2(Vsize) (i.e., when the selected map is clamped), the output of subtractor 221 remains at zero, and any higher LOD numbers are not reflected in the output of AND circuit 241. Subtractor 222 is used to count the number of clamped maps that must be included in the calculation. If Log2(Vsize) equals or exceeds LOD (no clamping), then subtractor 222 outputs a zero. But if LOD exceeds Log2(Vsize), subtractor 222 outputs a quantity that equals the amount by which LOD exceeds the value of Log2(Vsize), which is the number of clamped maps between LOD 0 and the selected texel. In either case, the output of subtractor 222 is added to the output of AND circuit 241 at adder 255. The output of adder 255 therefore represents the vertical difference (delta v) between the base address and the v coordinate of the map containing the selected texel, even if clamped maps are involved. When clamped maps are involved, the local v at input 213 will be zero, since there can be no local delta v if the entire map is only one texel high, and the value of final v will be the same as the output of adder 255.

The previously described method, and the functions performed by circuit 210, can also be performed in software, the instructions being stored on a machine readable medium for execution by at least one processor to execute the functions described herein.

The forgoing description is intended to be illustrative and not limiting. Other variations will occur to those of skill in the art. Such variations are included in the invention, which is limited only by the spirit and scope of the appended claims.

We claim:
1. A circuit comprising:
a subtractor circuit having first and second subtractor inputs and a first subtractor output to generate a first difference signal;
a first mask circuit having a first mask input coupled to the first subtractor input and a first mask output to generate a first thermal mask;
a second mask circuit having a second mask input coupled to the first subtractor output and a second mask output to generate an inverted second thermal mask; and
a first combinatorial logic circuit to perform a first logic operation on the first and inverted second thermal masks, the first combinatorial logic circuit having a first logic input coupled to the first mask output, a second logic input coupled to the second mask output, and a first logic output.

2. The circuit of claim 1, wherein the first combinatorial logic circuit is an AND circuit and the first logic operation is an AND operation.

3. The circuit of claim 1, further comprising an adder circuit having a first adder circuit input coupled to the first logic output, a second adder circuit input, and an adder circuit output, wherein the subtractor circuit includes a second subtractor output coupled to the second adder circuit input.

4. The circuit of claim 3, further comprising a second combinatorial logic circuit to perform a second combinatorial logic operation, the second combinatorial logic circuit having:
a third logic input coupled to the first logic output;
a fourth logic input to receive a local offset quantity; and
a second logic output.

5. The circuit of claim 4, wherein the second combinatorial logic circuit is an OR circuit and the second combinatorial logic operation is an OR operation.

6. The circuit of claim 1, further comprising a second combinatorial logic circuit to perform a second combinatorial logic operation, the second combinatorial logic circuit having:
a third logic input coupled to the first logic output;
a fourth logic input to receive a local offset quantity; and
a second logic output.

7. The circuit of claim 6, wherein the second combinatorial logic circuit is an OR circuit and the second combinatorial logic operation is an OR operation.

8. The circuit of claim 1, wherein the first mask circuit includes a first sticky decoder and the second mask circuit includes a second sticky decoder with an inverted output.

9. A method comprising:
defining a largest map having a first horizontal dimension and a first vertical dimension, the largest map being a primary map in a mip-map;
defining a second-largest map having a second horizontal dimension of one-half the first horizontal dimension and a second vertical dimension of one-half the first vertical dimension, the second-largest map being a modified version of the largest map;
storing the largest map in a first memory block beginning at a base address; and
storing the second largest map in a second memory block beginning at a first starting position immediately following the first memory block;
wherein a size of the second memory block is one-half a size of the first memory block.

10. The method of claim 9, wherein the second vertical dimension is one-half the first vertical dimension and the second horizontal dimension is one-half the first horizontal dimension.

11. The method of claim 9, wherein the first and second memory blocks are each defined by rows and columns, wherein all of the rows are equal in size.

12. A method comprising:
generating a first thermal mask having logic ones in a first rightmost portion, the first thermal mask representing a size of a primary map in a mip-map;
generating a second thermal mask having logic zeroes in a second rightmost portion, the second thermal mask representing a number of a selected map in the mip-map; and
combining the first and second thermal masks in a combinatorial logic operation to produce a first delta quantity;
wherein the first delta quantity represents a difference between a base address of the primary map and a starting position of the selected map.

13. The method of claim 12, wherein the combinatorial logic operation is an AND operation, and combining further includes adding an input quantity to a result of the AND operation to produce the first delta quantity, wherein the input quantity represents a number of clamped maps between the primary map and the selected map.

14. The method of claim 12, further comprising adding a local delta quantity to the first delta quantity to produce a second delta quantity, wherein the second delta quantity represents a number of texel rows between the base address and a position of a selected texel in the selected map.

15. The method of claim 14, further comprising multiplying the second delta quantity by a pitch and adding a horizontal displacement value to produce a texel displacement value.

16. The method of claim 15, further comprising multiplying the texel displacement value by a texel size to produce a memory displacement value.

17. The method of claim 12, wherein the logic ones are equal in quantity to a base 2 log of a vertical size of the primary map.

18. The method of claim 12, wherein the logic zeroes are equal in quantity to the number of the selected map.

19. A machine-readable medium having stored thereon instructions, which when executed by at least one processor causes said at least one processor to perform the following:
generating a first thermal mask having logic ones in a first rightmost portion;
generating a second thermal mask having logic zeroes in a second rightmost portion; and
combining the first and second thermal masks with a combinatorial logic operation to produce a first delta quantity;
wherein the first delta quantity represents a difference between a base address of a primary map and a starting position of a map containing a selected texel.

20. The medium of claim 19, wherein the combinatorial logic operation is an AND operation.

21. The medium of claim 20, wherein combining further includes adding an input quantity to a result of the AND operation to produce the first delta quantity, wherein the input quantity represents a number of clamped maps between the primary map and the map containing the selected texel.

22. The medium of claim 20, further comprising adding a local delta quantity to the first delta quantity to produce a second delta quantity, wherein the second delta quantity represents a number of texel rows between the base address and a position of the texel.

23. The medium of claim 22, further comprising multiplying the second delta quantity by a pitch and adding a horizontal displacement value to produce a texel displacement value.

24. The medium of claim 23, further comprising multiplying the texel displacement value by a texel size to produce a memory displacement value.

* * * * *